United States Patent
Park et al.

(10) Patent No.: US 12,290,823 B2
(45) Date of Patent: May 6, 2025

(54) ELECTROSTATIC PRECIPITATOR SYSTEM AND METHOD

(71) Applicant: Samsung E&A Co., Ltd., Seoul (KR)

(72) Inventors: Chae Gwan Park, Seoul (KR); Joeng Min Oh, Seoul (KR); Tae Jin Park, Seoul (KR); Jun Ho Seo, Seoul (KR); Yong Jung Kim, Seoul (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/723,576

(22) PCT Filed: Nov. 8, 2022

(86) PCT No.: PCT/KR2022/017478
§ 371 (c)(1),
(2) Date: Jun. 24, 2024

(87) PCT Pub. No.: WO2023/163317
PCT Pub. Date: Aug. 31, 2023

(65) Prior Publication Data
US 2025/0058330 A1 Feb. 20, 2025

(30) Foreign Application Priority Data
Feb. 22, 2022 (KR) .................... 10-2022-0023135

(51) Int. Cl.
*B03C 3/88* (2006.01)
*B65G 11/02* (2006.01)

(52) U.S. Cl.
CPC .............. *B03C 3/88* (2013.01); *B65G 11/026* (2013.01)

(58) Field of Classification Search
CPC ......... B03C 3/0175; B03C 3/88; B03C 3/017; B65G 11/026
See application file for complete search history.

(56) References Cited

U.S. PATENT DOCUMENTS 2,672,946 A * 3/1954 Rabkin ................. B03C 3/88
                                                            96/50
3,509,695 A * 5/1970 Egan ..................... B03C 3/88
                                                            55/342
(Continued)

FOREIGN PATENT DOCUMENTS

FR       2680474 A1 * 2/1993 ............ B03C 3/014
JP       1989217117        8/1989
(Continued)

OTHER PUBLICATIONS

Notice of Non-Final Office Action, issued Jul. 18, 2022, in corresponding Korean Application No. 10-2022-0223135, 18 pages (with English-language translation).
(Continued)

*Primary Examiner* — Christopher P Jones
*Assistant Examiner* — Sonji Turner
(74) *Attorney, Agent, or Firm* — Panitch Schwarze Belisario & Nadel LLP

(57) ABSTRACT

Disclosed are an electrostatic precipitator system and method. The disclosed electrostatic precipitator system includes: an electrostatic precipitator; a main hopper which is disposed below the electrostatic precipitator so as to be in fluid communication with the electrostatic precipitator; a plurality of sub-hoppers disposed below the main hopper so as to be in fluid communication with the main hopper; a vertical duct disposed below each sub-hopper so as to be in fluid communication with each sub-hopper; and a water tank disposed below the vertical duct so as to be in fluid communication with the vertical duct.

10 Claims, 5 Drawing Sheets

(56) References Cited

U.S. PATENT DOCUMENTS 3,785,119 A * 1/1974 McIlvaine .................. B03C 3/88
　　　　　　　　　　　　　　　　　　　110/119
5,624,476 A * 4/1997 Eyraud ..................... B03C 3/88
　　　　　　　　　　　　　　　　　　　95/71

FOREIGN PATENT DOCUMENTS

| JP | H01217117 A * | 8/1989 |
| JP | 1997014851 A | 1/1997 |
| JP | 1999014851 | 2/2009 |
| JP | 2009228974 A | 10/2009 |
| JP | 2013216963 A * | 10/2013 |
| KR | 101003263 B1 * | 12/2010 |
| KR | 101307600 B1 | 9/2013 |
| KR | 101394545 B1 | 5/2014 |
| KR | 101783179 B1 * | 9/2017 |
| KR | 102426256 B1 | 7/2022 |

OTHER PUBLICATIONS

Notice of Allowance, issued Jul. 18, 2022, in corresponding Korean Application No. 10-2022-0023135, 4 pages (with English-language translation).

International Search Report, issued Feb. 13, 2023, in corresponding International Application No. PCT/KR2022/017478, 11 pages (with English-language translation).

* cited by examiner

ELECTROSTATIC PRECIPITATOR SYSTEM AND METHOD

TECHNICAL FIELD

An electrostatic precipitation system and method are disclosed. More specifically, disclosed are an electrostatic precipitation system and method that enable continuous operation without issues of clogging and performance degradation of facilities due to discharge of dusts.

BACKGROUND ART

An electrostatic precipitator is a device that applies an electric field to dusts suspended in a gas, e.g., air and charge them, and cleans the gas by collecting particles contained in dusts with an electrostatic force. Depending on the method of removing dusts collected in the precipitator, the electrostatic precipitator may be classified into a wet type and a dry type, and depending on the flow of the gas, the electrostatic precipitator may be classified into a vertical type and a horizontal type.

For example, in an electric power plant, to remove a large quantity of dusts and soot contained in exhaust gases from a boiler, an electrostatic precipitator is installed in the middle of a gas flow sent to the chimney. To collect dusts with electricity, a direct current voltage of tens of thousands of volts (V) is required.

Conventionally, after dusts are collected in an electrostatic precipitator, a filter, or the like, the collected dusts are discharged through a hopper and transferred using a conveyor, a duct, or a rotary airlock valve (RAV).

However, when transferring low-density dusts of high viscosity and high hygroscopicity, issues hindering normal operations frequently arise because such dusts tend to stick to facilities, causing transfer failure or damage to facilities. In addition, a large number of steel structures are required to support such facilities, and there is a high possibility of wear or damage to rotating parts, such as motors or rotary valves.

DISCLOSURE

Technical Problem

One embodiment of the present disclosure provides an electrostatic precipitation system that enables continuous operation without issues of clogging and performance degradation of facilities due to discharge of dusts.

Another embodiment of the present disclosure provides an electrostatic precipitation method that enables continuous operation without issues of clogging and performance degradation of facilities due to discharge of dusts.

Technical Solution

According to one aspect of the present disclosure, provided is an electrostatic precipitation system including:
an electrostatic precipitator;
a main hopper disposed below the electrostatic precipitator and disposed to be in fluid communication with the electrostatic precipitator;
a plurality of sub-hoppers disposed below the main hopper and disposed to be in fluid communication with the main hopper;
a vertical duct disposed below each of the sub-hoppers and disposed to be in fluid communication with each of the sub-hoppers; and
a water tank disposed below the vertical duct and disposed to be in fluid communication with the vertical duct.

A length of the vertical duct may be twice or more a length of each sub-hopper.

The electrostatic precipitation system may further include a flexible joint disposed between the vertical duct and the water tank and configured to connect the vertical duct and the water tank to each other.

The electrostatic precipitation system may not include a dust fall-hindering member between the main hopper and the water tank.

The electrostatic precipitation system may further include a water supply pipe, a water drain pipe, and a circulation pipe branched from the water drain pipe, each configured to be in fluid communication with the water tank.

The electrostatic precipitation system may further include a first flow control valve installed in the water supply pipe, and a second flow control valve installed in the circulation pipe.

The electrostatic precipitation system may further include a water level meter configured to measure a level of liquid filled in the water tank, a pump configured to discharge liquid from the water tank, and a third flow control valve installed at a back-end of the circulation pipe as a back-end of the pump and configured to control a discharge amount of liquid in accordance with a signal of the water level meter.

According to another aspect of the present disclosure, provided is an electrostatic precipitation method including:
a step (S10) of supplying an exhaust gas of high temperature of 300° C. or more to an electrostatic precipitator, and separating dusts from the exhaust gas, thereby generating clean gas;
a step (S20) of transferring by gravity, to a main hopper, the dusts separated in the step (S10);
a step (S30) of transferring by gravity, to a plurality of sub-hoppers, the dusts transferred to the main hopper in the step (S20);
a step (S40) of transferring by gravity, to a vertical duct, the dusts transferred to each of the sub-hoppers in the step (S30); and
a step (S50) of introducing by gravity, into a water tank, the dusts transferred to each of the vertical ducts in the step (S40).

The steps (S20) to (S40) may be configured to allow the dusts separated in the step (S10) to fall to the water tank by gravity without being hindered by a dust fall-hindering member.

The electrostatic precipitation method may further include a step (S50) of maintaining a concentration of sodium carbonate in liquid filled in the water tank at a reference value or less.

The step (S50) may include a step (S50-1) of supplying water to the water tank at a first flow rate; a step (S50-2) of discharging liquid filled in the water tank at a second flow rate; a step (S50-3) of recirculating a portion of the liquid discharged in the step (S50-2) to the water tank at a third flow rate; and a step (S50-4) of discharging a remaining portion of the liquid discharged in the step (S50-2) out of the water tank at a fourth flow rate.

The electrostatic precipitation method may further include a step (S60) of measuring a level of the liquid filled in the water tank, and the fourth flow rate in the step (S50-4) may be determined according to the level of liquid in the water tank measured in the step (S60).

Advantageous Effects

An electrostatic precipitation system and method according to an embodiment of the present disclosure may achieve reliable and normal operation of facilities by completely addressing clogging and damage issues that frequently arise in conventional dust-transferring facilities in case of dusts characterized by low density, high viscosity, and high water solubility.

MODE FOR INVENTION

Hereinbelow, an electrostatic precipitation system according to an embodiment of the present disclosure is described in greater detail with reference to the drawings.

In the present specification, "fluid communication" means that two or more members are connected such that fluid is able to flow within these members.

Figure 1:
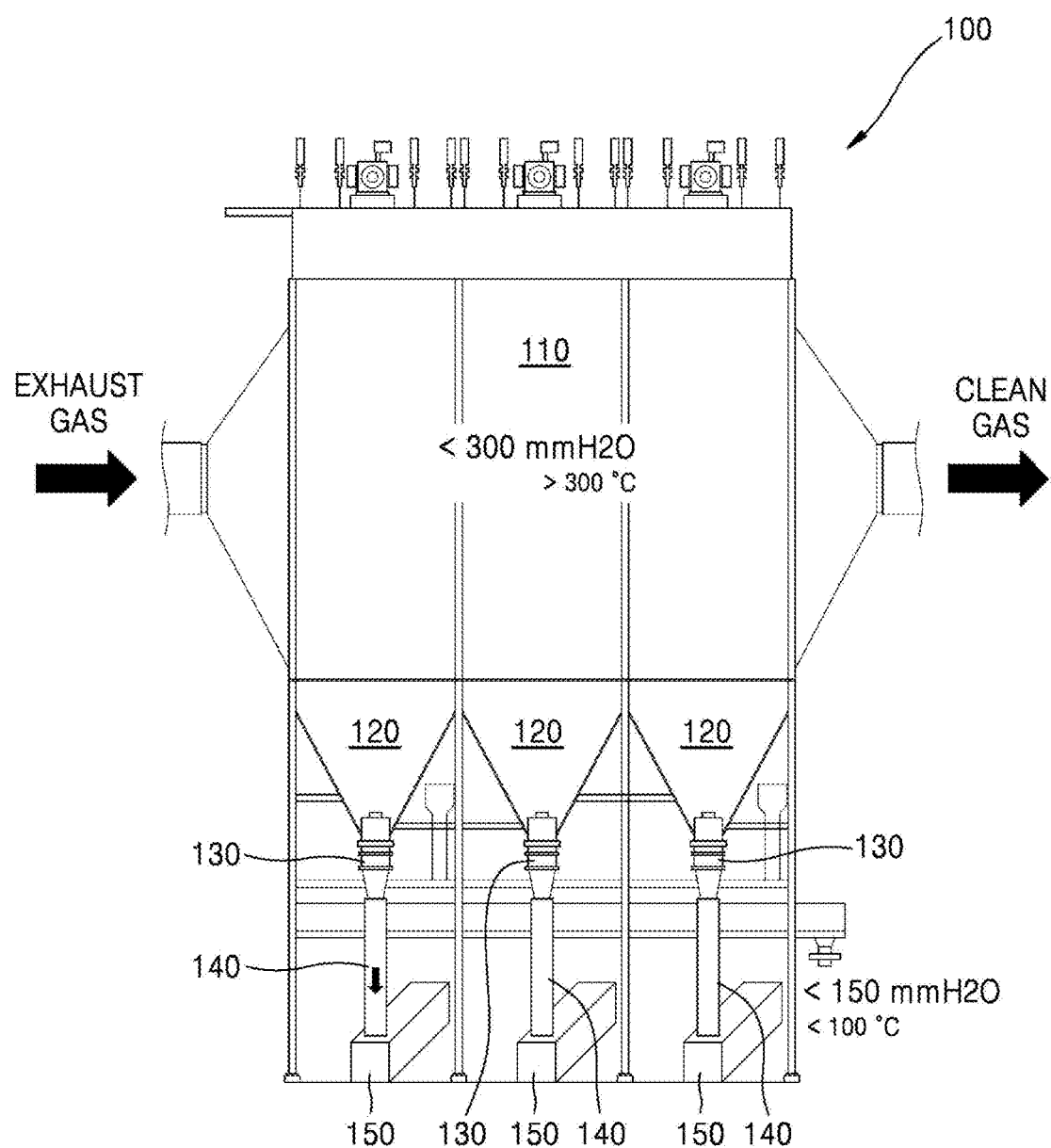
FIG. 1 is a schematic diagram of an electrostatic precipitation system according to an embodiment of the present disclosure.
Figure 2:
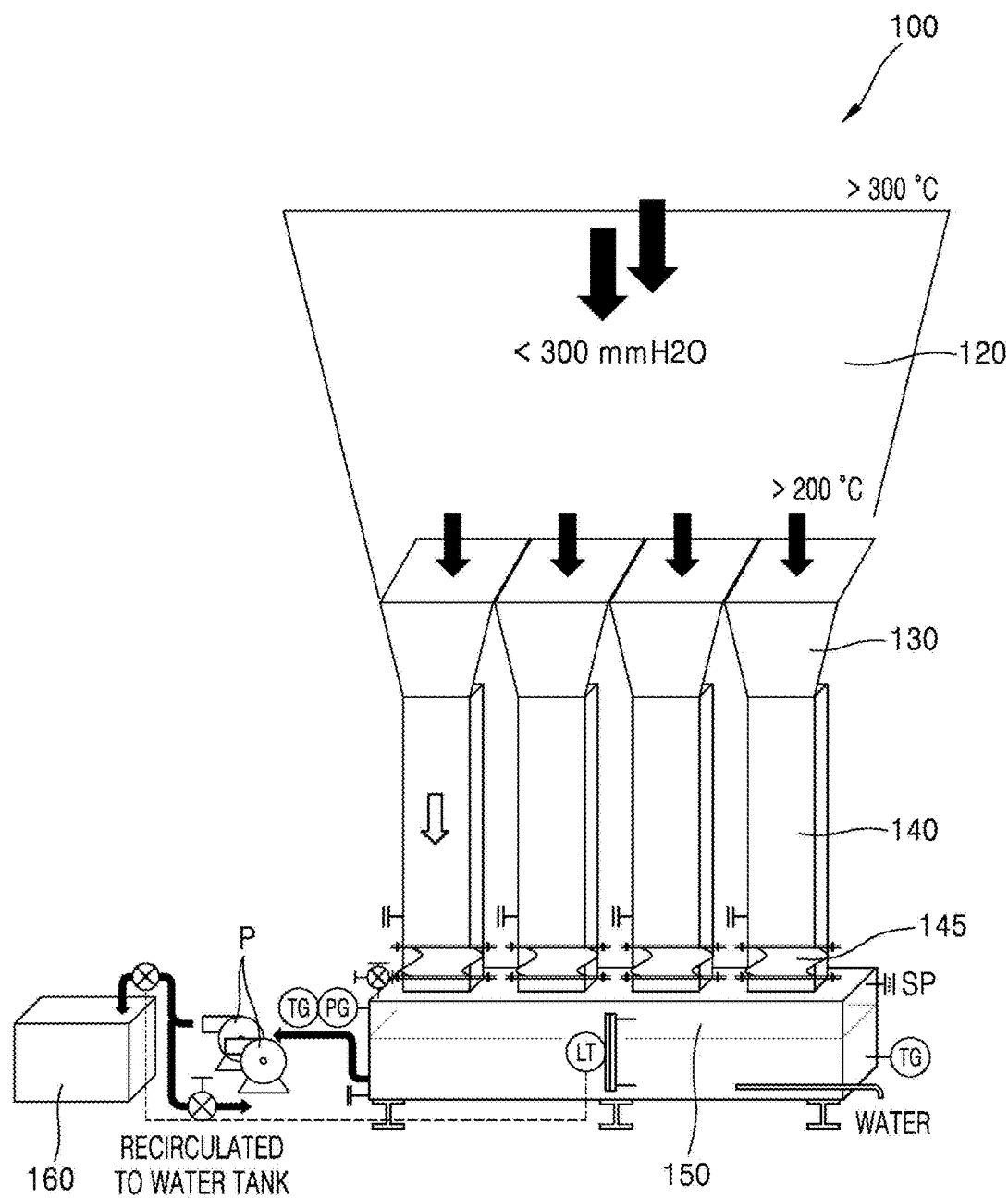
FIG. 2 is an enlarged view of a middle portion and a portion below the middle portion of the electrostatic precipitation system of FIG. 1.
Figure 3:
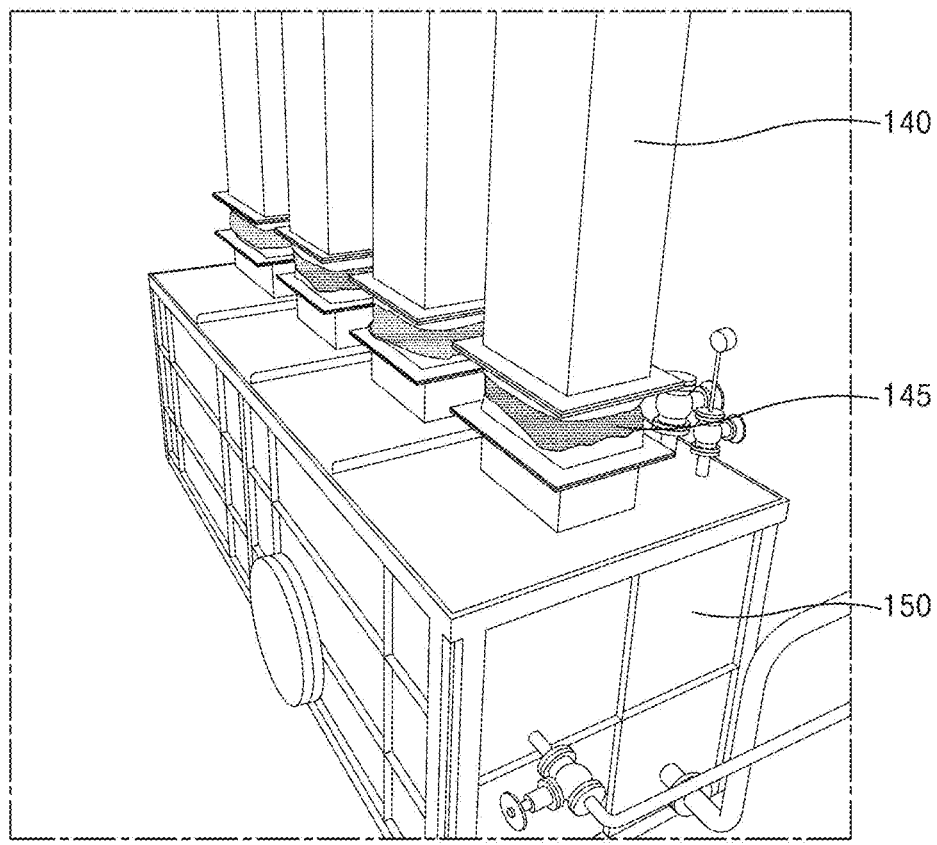
FIG. 3 is an enlarged view of a lower portion of the electrostatic precipitation system of FIG. 1.

FIG. 1 is a schematic diagram illustrating an electrostatic precipitation system 100 according to an embodiment of the present disclosure, FIG. 2 is an enlarged view of a middle portion and a portion below the middle portion of the electrostatic precipitation system 100 of FIG. 1, and FIG. 3 is an enlarged view of a lower portion of the electrostatic precipitation system 100 of FIG. 1.

Referring to FIGS. 1 to 3, the electrostatic precipitation system 100 according to an embodiment of the present disclosure includes an electrostatic precipitator 110, a main hopper 120, a plurality of sub-hoppers 130, a plurality of vertical ducts 140, and a water tank 150.

The electrostatic precipitator 110 is a device for removing dusts from exhaust gases by using electrostatic force, and the flow of gas passing through the electrostatic precipitator 110 may be horizontal.

The exhaust gas is high temperature of 300° C. or more, and the exhaust gas contains dusts, wherein these dusts are characterized by low density, high viscosity, and high water solubility.

In addition, the gas pressure and temperature inside the electrostatic precipitator 110 may be less than 300 mmH$_2$O, and more than 300° C., respectively.

In addition, conventionally, such dusts are discharged to the outside through a dust-transferring facility (not shown) installed below the electrostatic precipitator 110. However, due to their high viscosity, such dusts adhere, then solidify onto ducts, conveyor blades, dampers, valves, etc. in the dust-transferring facility, to block a transfer path or cause damage to the dust-transferring facility, thus degrading the transfer capacity of the dust-transferring facility, and consequently, impeding the normal operation of an electrostatic precipitation system.

In the electrostatic precipitation system 100 of the present disclosure, dusts separated from an exhaust gas by the action of the electrostatic precipitator 110 may, due to gravity, sequentially pass through the main hopper 120, the sub-hopper 130, and the vertical duct 140, and then fall into the water tank 150 which will be described below. As such, because the dusts separated from the exhaust gas after falling into the water tank 150 are removed from the water tank 150 on-line while the electrostatic precipitator 110 is operating, the electrostatic precipitation system 100 may continue to be operated smoothly without operation failure caused by dusts.

The main hopper 120 is an equipment that primarily collects dusts separated from an exhaust gas in the electrostatic precipitator 110. Specifically, the dusts separated from an exhaust gas in the electrostatic precipitator 110 may be introduced into the main hopper 120 by gravity. The main hopper 120 may be disposed below the electrostatic precipitator 110 and may be disposed to be in fluid communication with the electrostatic precipitator 110.

In addition, one main hopper 120 may be provided, or two or more main hoppers 120 may be provided.

A plurality of sub-hoppers 130 serve to separate the dusts descending via the respective main hoppers 120 and cause the dusts to descend evenly across horizontal and vertical locations inside the respective sub-hoppers 130. For example, in this case, the dusts may descend in a flow similar to plug flow, through the respective sub-hoppers 130.

As an example, if the plurality of sub-hoppers 130 and the plurality of vertical ducts 140 are omitted, and the main hopper 120 is vertically elongated, only one large opening is left in the center. In this case, the dusts descending through the inside of the main hopper 120, due to being tilted or shaken, may descend unevenly across horizontal and/or vertical locations. For example, in this case, the dusts may descend in a flow similar to parabolic flow or descend while being tilted to one side or to several sides through the main hopper 120, which cause the dusts to stick to the inner walls, impeding the smooth flow of dusts; and in some cases, the dusts may at least partially block the dusts-descending path. In addition, in this case, to ensure smooth discharge of dusts, the width of a lower end portion of the main hopper 120 needs to be enlarged, as well as the installation space and strength of the structures need to be increased, which incurs an increase in operating costs, material costs, and the like.

As another example, if the plurality of sub-hoppers 130 are omitted, and the plurality of vertical ducts 140 are directly connected to a lower end portion of the main hopper 120, there may be a unnecessarily large opening of each of the plurality of vertical ducts 140 such that an even larger space is needed in an upper end portion and a lower end portion of each of the plurality of vertical ducts 140, thus further complicating the configuration of steel structures, facilities, and the like. Installation of the plurality of sub-hoppers 130 is to ensure a large storage space in an upper end portion of each of the plurality of sub-hoppers 130, and the use of a plurality of sub-hoppers 130 is to decrease the discharge area in a lower end portion of each of the plurality of sub-hoppers 130, thereby ensuring efficient use of space and facilities.

The plurality of sub-hoppers 130 may all be disposed below the main hopper 120 and may be disposed in fluid communication with the main hopper 120.

In addition, the plurality of sub-hoppers 130 may each have an angle of repose (the angle that an inclined inner wall makes with a virtual horizontal plane) that securely receives all of the dusts descended from the main hopper 120 without leaking to the outside and at the same time, allows the received dusts to smoothly descend along the inner walls without accumulating on the inner walls by the action of gravity alone. The lighter and more viscous the dust particles are, the larger the angle of repose is required.

In addition, the temperature of a part inside the main hopper 120 that is adjacent to the plurality of sub-hoppers 130 may be more than 200° C.

A plurality of vertical ducts 140 may be in fluid communication with a plurality of sub-hoppers 130 in a one-on-one manner to thereby serve to cause the dusts descending through the plurality of sub-hoppers 130 to descend evenly across horizontal and vertical locations within each of the vertical ducts 140. For example, in this case, the dusts may descend in a flow similar to plug flow, through each of the vertical ducts 140.

In addition, a plurality of vertical ducts 140 may be integrally formed with a plurality of sub-hoppers 130. For example, the plurality of vertical ducts 140 may be omitted, and lower portions of the plurality of sub-hoppers 130 may be extended in the same shape and length as the omitted plurality of vertical ducts 140.

The water tank 150 serves to mix the dusts introduced therein with water to thereby form aqueous solution.

In addition, the water tank 150 may be disposed below the vertical duct 140 and disposed to be in fluid communication with the vertical duct 140.

In addition, there may be a temperature gauge TG, a pressure gauge PG and/or a sight port SP installed in the water tank 150 to enable monitoring whether the electrostatic precipitation system 100 is operating stably and normally.

In addition, a plurality of sub-hoppers 130, a plurality of vertical ducts 140, and the water tank 150 may be disposed to be exposed to room temperature (about 10° C. to about 40° C.).

As described above, the main hopper 120, the sub-hopper 130, and the vertical duct 140 are sequentially disposed between the water tank 150 and the electrostatic precipitator 110, which results in the water tank 150 being installed in an area significantly apart from the electrostatic precipitator 110 through which high-temperature exhaust gas passes, such that the water tank 150 can be less affected by high temperature originating from a high-temperature exhaust gas. Specifically, because exposure of a lower end portion of the long vertical duct 140 to room temperature leads to decrease in the temperature of dusts and air collected in the water tank 150 installed in a lower end portion of the vertical duct 140, which results in lowering the pressure of air, naturally obtained therefrom may be a locking function that physically minimizes the moisture or air in the lower end portion of the vertical duct 140 flowing reversely to an upper end portion of the vertical duct 140 that is relatively higher pressure/higher temperature.

In addition, the gas pressure and temperature of an area inside the vertical duct 140 that is adjacent to the water tank 150 may be less than 150 mmH$_2$O, and less than 150° C., respectively.

In addition, to avoid the influence of a high-temperature exhaust gas passing through the electrostatic precipitator 110, the length of each vertical duct 140 may be set to be twice or more the length of each sub-hopper 130. For example, each vertical duct 140 may have a length of 4 m or more.

If the water tank 150 is not installed in the electrostatic precipitation system 100, but separate dust-transferring means is installed, as described above, troubles due to high-viscosity dusts may occur in the dust-transferring means, which necessitates the entire system to be shut down and cooled before the accumulated dusts are manually cleaned out from the inside, which incurs the associated expenses and downtime cost.

In addition, the waste heat recovery system 100, in a case in which dusts originating from exhaust gas are accumulated therein, may further include an air blaster (not shown) configured to forcibly transfer the accumulated dusts to the water tank 150. Specifically, the air blaster may be configured to eject compressed air to dusts accumulated inside the electrostatic precipitation system 100, thereby forcibly swiping the accumulated dusts into the water tank 150.

In addition, the electrostatic precipitation system 100 may further include a flexible joint 145.

The flexible joint 145 may be disposed between the vertical duct 140 and the water tank 150 and configured to connect the vertical duct 140 and the water tank 150 to each other. When the vertical duct 140 and the water tank 150 undergo thermal expansion and thermal contraction, the flexible joint 145 may accommodate their thermal expansion and thermal contraction, thereby serving to ensure the secure connection between the vertical duct 140 and the water tank 150 at all times.

In addition, the electrostatic precipitation system 100 may not include a dust fall-hindering member (not shown) in the entire section between the main hopper 120 and the water tank 150.

The dust fall-hindering member refers to any member that hinders dusts included in the exhaust gas from falling from the main hopper 120 to the water tank 150 by gravity. For example, the dust fall-hindering member may include a protruded portion, a filter, or a combination thereof.

For instance, if the dust fall-hindering member is installed in a section between the main hopper 120 and the water tank 150, highly viscous dusts may stick to the dust fall-hindering member, giving rise to accumulated dusts over time, such accumulated dusts may accumulate to an extend that accumulated dusts form even inside the main hopper 120, the sub-hopper 130, and/or the vertical duct 140, which amounts to failing to achieve the original purpose of the water tank 150 installation.

The water tank 150 is not limited to any particular shape and size, and examples thereof are illustrated in FIGS. 1 to 3.

Figure 4:
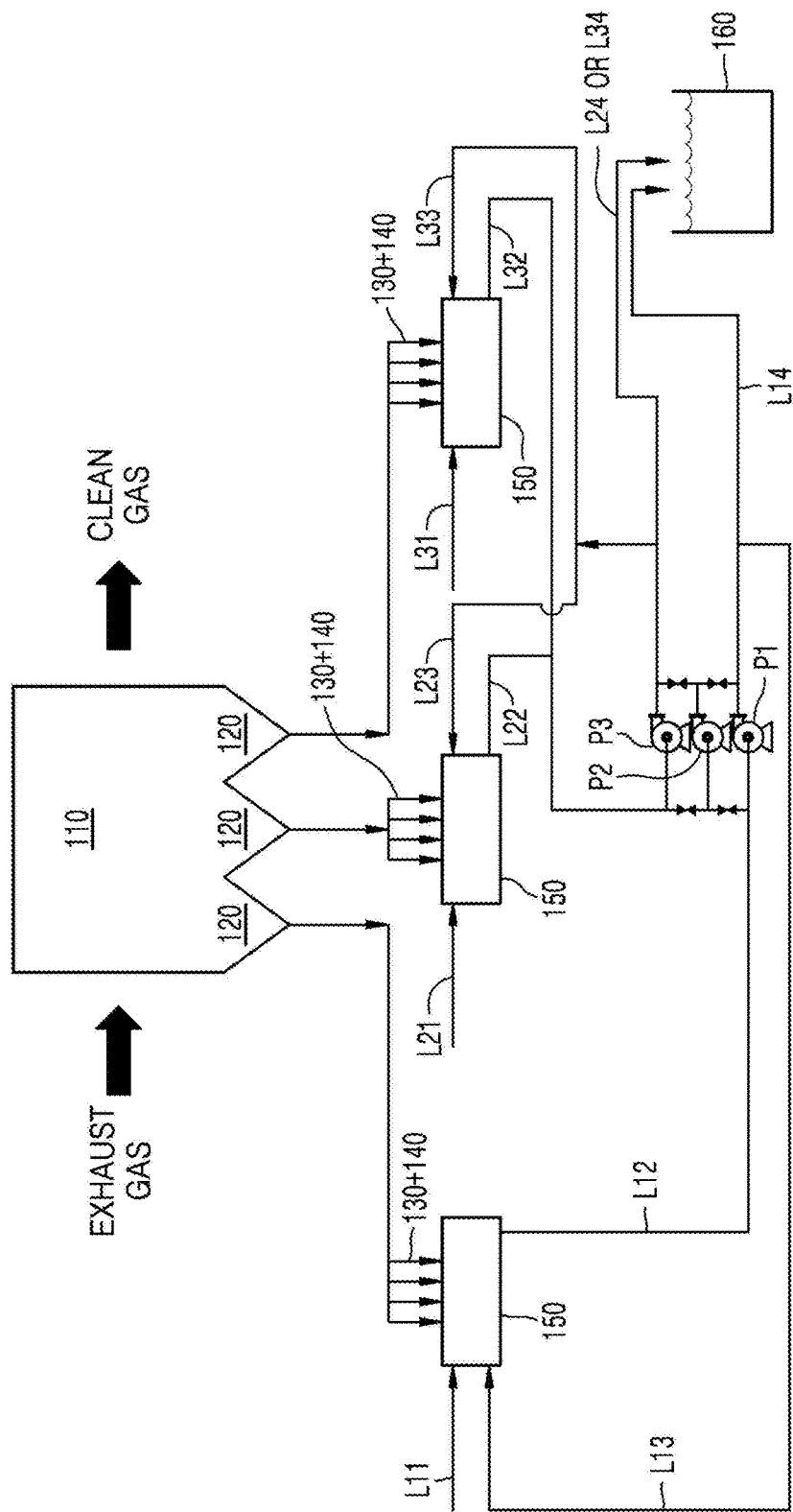
FIG. 4 is a schematic view of an electrostatic precipitator, a main hopper, a sub-hopper, a vertical duct, a water tank, and auxiliary facilities connected thereto in the electrostatic precipitation system of FIG. 1.

FIG. 4 is a schematic diagram illustrating the electrostatic precipitator 110, the main hopper 120, the sub-hoppers 130, the vertical ducts 140, the water tank 150, and auxiliary facilities connected thereto in the electrostatic precipitation system 100 of FIG. 1.

Referring to FIG. 4, three main hoppers 120 may be disposed below the electrostatic precipitator 110, four sub-hoppers 130 may be disposed below each of the main hoppers 120, one vertical duct 140 may be disposed below each of the sub-hoppers 130, and one water tank 150 may be disposed for each set of four vertical ducts 140. Accordingly, the electrostatic precipitation system 100 may include a total of one electrostatic precipitator 110, a total of three main hoppers 120, a total of twelve sub-hoppers 130, a total of twelve vertical ducts 140, and a total of three water tanks 150.

To each water tank 150, water supply pipes L11, L21, L31, water drain pipes L12, L22, L32, and circulation pipes L13, L23, L33 may be connected in fluid communication.

Specifically, dusts may be introduced via four vertical ducts 140 into the left water tank 150, and the introduced dusts may be mixed with water supplied to the left water tank 150 via the water supply pipe L11 to form an aqueous solution. Then, a portion of the aqueous solution may be, by the action of the pump P1, P2, or P3, discharged in a form of aqueous dust solution from the corresponding left water tank 150 via the water drain pipe L12, wherein a portion of the amount of the discharged aqueous dust solution may be introduced into a separate water tank 160 via the water drain pipe L14 while the remaining portion thereof may be recirculated to the corresponding left water tank 150 via the circulation pipe L13. In particular, out of a total of three pumps P1, P2, P3, two pumps may be operating while the remaining one pump is an emergency pump for an event in which any one of the two operating pumps fails. The aqueous dust solution discharged to a separate water tank 160 may be controlled to have a predetermined concentration of dusts (specifically, a sodium carbonate concentration), and the resulting concentration-controlled aqueous dust solution may be easily used in other processes to cut the chemical costs.

In addition, dusts may be introduced into the middle water tank 150 via four vertical ducts 140, and the introduced dusts may be mixed with water supplied to the middle water tank 150 via the water supply pipe L21 to form an aqueous solution. Then, a portion of the aqueous solution may be, by the action of the pump P1, P2, or P3, discharged in a form of aqueous dust solution from the corresponding middle water tank 150 via the water drain pipe L22, wherein a portion of the amount of the discharged aqueous dust solution may be introduced into a separate water tank 160 via the water drain pipe L24 while the remaining portion thereof may be recirculated to the corresponding middle water tank 150 via the circulation pipe L23.

In addition, dusts may be introduced into the right water tank 150 via four vertical ducts 140, and the introduced dusts may be mixed with water supplied to the right water tank 150 via the water supply pipe L31 to form an aqueous solution. Then, a portion of the aqueous solution may be, by the action of the pump P1, P2, or P3, discharged in a form of aqueous dust solution from the corresponding right water tank 150 via the water drain pipe L32, wherein a portion of the amount of the discharged aqueous dust solution may be introduced into a separate water tank 160 via the water drain pipe L34 while the remaining portion thereof may be recirculated to the corresponding right water tank 150 via the circulation pipe L33. In particular, the water drain pipe L22 and the water drain pipe L32 may be combined into a single pipe and then connected to a pump P1, P2, or P3. In addition, the water drain pipe L24 and the water drain pipe L34 may be combined into a single pipe.

Figure 5:
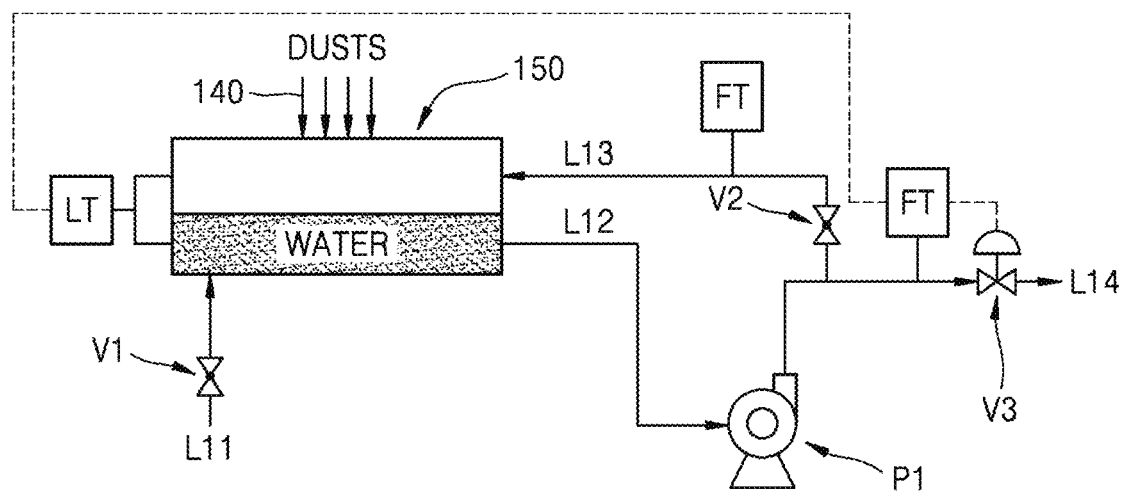
FIG. 5 is an enlarged view of a part of FIG. 4 for illustrating a method of maintaining a constant water level in a water tank.

FIG. 5 is an enlarged view of a part of FIG. 4 for illustrating a method of maintaining a constant water level in the water tank 150. By the aforementioned method, the water level in the water tank 150 may be maintained constant at around 70% of the full water level.

Referring to FIG. 5, the electrostatic precipitation system 100 as described above may include the water supply pipe L11, the water drain pipes L12, L14, and the circulation pipe L13, each configured to be in fluid communication with the water tank 150.

The water supply pipe L11 serves to supply water to the water tank 150.

The water drain pipe L12 serves to drain liquid (e.g., aqueous dust solution=a mixture of water and dusts) from the water tank 150.

The circulation pipe L13, which is branched from the water drain pipe L12, serves to recirculate part of liquid flowing through the water drain pipe L12 to the water tank 150.

The water drain pipe L14 serves to discharge to the outside, thereby remove, part of liquid discharged from the water tank 150 via the water drain pipe L12.

In addition, the electrostatic precipitation system 100 may further include a first flow control valve V1 and a second flow control valve V2. The first flow control valve V1 is installed in the water supply pipe L1 and serves to control the flow rate of water supplied to the water tank 150 via the water supply pipe L1.

The second flow control valve V2 is installed in the circulation pipe L13 and serves to control the flow rate of liquid being recirculated to the water tank 150 via the circulation pipe L13, among liquid discharged from the water tank 150 via the water drain pipe L12.

The first flow control valve V1 and the second flow control valve V2 may each be a globe valve, but the present disclosure is not limited thereto.

In addition, the electrostatic precipitation system 100 may further include a water level meter LT, a pump P1, and a third flow control valve V3.

The water level meter LT may be configured to measure the level of liquid filled in the water tank 150.

The pump P1 may be configured to forcibly discharge liquid from the water tank 150.

The third flow control valve V3 may be installed at a back-end of the circulation pipe L13 as a back-end of the pump P1 and configured to control the discharge amount of liquid in accordance with a signal from the water level meter LT. The liquid having passed through the third flow control valve V3 may be discharged via the water drain pipe L14 and enter the separate water tank 160.

In addition, a flow rate meter FT may be installed in each of the water drain pipe L12 and the circulation pipe L13.

Another embodiment of the present disclosure provides an electrostatic precipitation method that can be carried out by using the aforementioned electrostatic precipitation system 100.

Hereinbelow, an electrostatic precipitation method according to an embodiment of the present disclosure is described in greater detail with reference to FIGS. 1 to 5.

The electrostatic precipitation method includes a step (S10) of supplying an exhaust gas of high temperature of 300° C. or more to an electrostatic precipitator, and separating dusts from the exhaust gas, thereby generating clean gas; a step (S20) of transferring by gravity, to a main hopper, the dusts separated in the step (S10); a step (S30) of transferring by gravity, to a plurality of sub-hoppers, the dusts transferred to the main hopper in the step (S20); a step (S40) of transferring by gravity, to a vertical duct, the dusts transferred to each of the sub-hoppers in the step (S30); and a step (S50) of introducing by gravity, into a water tank, the dusts transferred to each of the vertical ducts in the step (S40).

The steps (S20) to (S40) may be configured to allow the dusts separated in the step (S10) to fall to the water tank 150 by gravity without being hindered by a dust fall-hindering member (not shown).

In addition, the electrostatic precipitation method may further include a step (S50) of maintaining a concentration of sodium carbonate in liquid filled in the water tank 150 to a reference value (for example, 10 wt %) or less.

The step (S50) may include a step (S50-1) of supplying water to the water tank 150 at a first flow rate (for example, 10 m$^3$/hr), a step (S50-2) of discharging liquid filled in the water tank 150 at a second flow rate (for example, 60 m$^3$/hr), a step (S50-3) of recirculating a portion of the liquid discharged in the step (S50-2) to the water tank 150 at a third flow rate (for example, 50 m³/hr), and a step (S50-4) of discharging a remaining portion of the liquid discharged in the step (S50-2) out of the water tank 150 at a fourth flow rate (for example, 10 m³/hr).

In addition, the electrostatic precipitation method may further include a step (S60) of measuring the level of liquid filled in the water tank 150. In this case, the fourth flow rate in the step (S50-4) may be determined in accordance with the level of liquid in the water tank 150 measured in the step (S60). For example, as the amount or temperature of dusts introduced in the water tank 150 increases, the amount of water evaporated from the water tank 150 increases, and to manage such a situation, the fourth flow rate may be decreased.

The present disclosure has been described with reference to the drawings, but these are merely illustrative examples, and it will be apparent to those skilled in the art that various modifications and equivalent implementations can be made therein. Therefore, the scope of the present disclosure should be defined by the appended claims.

The invention claimed is:

1. An electrostatic precipitation system comprising:
an electrostatic precipitator;
a main hopper disposed below the electrostatic precipitator and disposed to be in fluid communication with the electrostatic precipitator;
a plurality of sub-hoppers disposed below the main hopper and disposed to be in fluid communication with the main hopper;
a vertical duct disposed below each of the sub-hoppers and disposed to be in fluid communication with each of the sub-hoppers; and
a water tank disposed below the vertical duct and disposed to be in fluid communication with the vertical duct, wherein each of the plurality of sub-hoppers has an angle of repose that securely receives all dusts descended from the main hopper without leaking outside of each of the sub-hoppers and at the same time, allows the received dusts to smoothly descend along inner walls of each of the sub-hoppers without accumulating on the inner walls by gravity alone, wherein the electrostatic precipitation system does not comprise a dust fall-hindering member between the main hopper and the water tank.

2. The electrostatic precipitation system of claim 1, wherein a length of the vertical duct may be twice or more that of each of the sub-hoppers.

3. The electrostatic precipitation system of claim 1, further comprising a flexible joint disposed between the vertical duct and the water tank and configured to connect the vertical duct and the water tank to each other.

4. The electrostatic precipitation system of claim 1, further comprising a water supply pipe, a water drain pipe, and a circulation pipe branched from the water drain pipe, each configured to be in fluid communication with the water tank.

5. The electrostatic precipitation system of claim 4, further comprising a first flow control valve installed in the water supply pipe, and a second flow control valve installed in the circulation pipe.

6. The electrostatic precipitation system of claim 5, further comprising a water level meter configured to measure a level of liquid filled in the water tank, a pump configured to discharge liquid from the water tank, and a third flow control valve installed at a back-end of the circulation pipe as a back-end of the pump and configured to control a discharge amount of liquid in accordance with a signal of the water level meter.

7. An electrostatic precipitation method comprising:
a step (S10) of supplying an exhaust gas of high temperature of 300° C. or more to an electrostatic precipitator, and separating dusts from the exhaust gas, thereby generating clean gas;
a step (S20) of transferring the dusts separated in the step (S10) to a main hopper by gravity;
a step (S30) of transferring the dusts transferred to the main hopper in the step (S20) to a plurality of sub-hoppers by gravity;
a step (S40) of transferring the dusts transferred to each of the sub-hoppers in the step (S30) to a vertical duct by gravity; and
a step (S50) of introducing by gravity, into a water tank, the dusts transferred to each of the vertical ducts in the step (S40),
wherein each of the plurality of sub-hoppers has an angle of repose that securely receives all of the dusts descended from the main hopper without leaking outside of each of the sub-hoppers and at the same time, allows the received dusts to smoothly descend along inner walls of each of the sub-hoppers without accumulating on the inner walls by gravity alone, and
wherein the steps (S20) to (S40) are configured to allow the dusts separated in the step (S10) to fall to the water tank by gravity without being hindered by a dust fall-hindering member.

8. The electrostatic precipitation method of claim 7, further comprising a step (S50) of maintaining a concentration of sodium carbonate in a liquid filled in the water tank at a reference value or less.

9. The electrostatic precipitation method of claim 8, wherein the step (S50) comprises a step (S50-1) of supplying water to the water tank at a first flow rate, a step (S50-2) of discharging liquid filled in the water tank at a second flow rate, a step (S50-3) of recirculating a portion of the liquid discharged in the step (S50-2) to the water tank at a third flow rate, and a step (S50-4) of discharging a remaining portion of the liquid discharged in the step (S50-2) at a fourth flow rate out of the water tank.

10. The electrostatic precipitation method of claim 9, further comprising a step (S60) of measuring a level of the liquid filled in the water tank, wherein the fourth flow rate in the step (S50-4) is determined according to the level of the liquid in the water tank measured in the step (S60).

* * * * *